United States Patent [19]

Tendler

[11] Patent Number: 5,736,962
[45] Date of Patent: Apr. 7, 1998

[54] TIME SINCE LAST FIX ANNUNCIATION SYSTEM FOR GPS-BASED WIRELESS RESCUE SYSTEM

[75] Inventor: Robert K. Tendler, Chestnut Hill, Mass.

[73] Assignee: Tendler Cellular, Inc., Boston, Mass.

[21] Appl. No.: 608,483

[22] Filed: Feb. 28, 1996

[51] Int. Cl.$^6$ .................... H04B 7/185; G01S 5/02
[52] U.S. Cl. .................... 342/357; 364/449.7
[58] Field of Search .................... 342/357; 364/449.7

[56] References Cited

U.S. PATENT DOCUMENTS 5,355,140  10/1994  Slavin et al. .................... 342/357
5,432,841  7/1995  Rimer .................... 342/457

*Primary Examiner*—Theodore M. Blum
*Attorney, Agent, or Firm*—Robert K. Tendler

[57] ABSTRACT

In a wireless emergency location system in which a cellular phone is utilized to communicate the location of an individual or vehicle by announcing position based on the output of a GPS receiver, time since last fix is computed and annunciated to permit emergency personnel to ascertain if the position information is valid. In a one embodiment, velocity and direction of travel are also annunciated for permitting emergency personnel to calculate the location of the phone and thus a stricken individual. Time since last fix as well as velocity and direction annunciation is also used to enable location of stolen or hijacked vehicles assuming location information is no longer available at the phone or satellite fix has been lost.

7 Claims, 6 Drawing Sheets

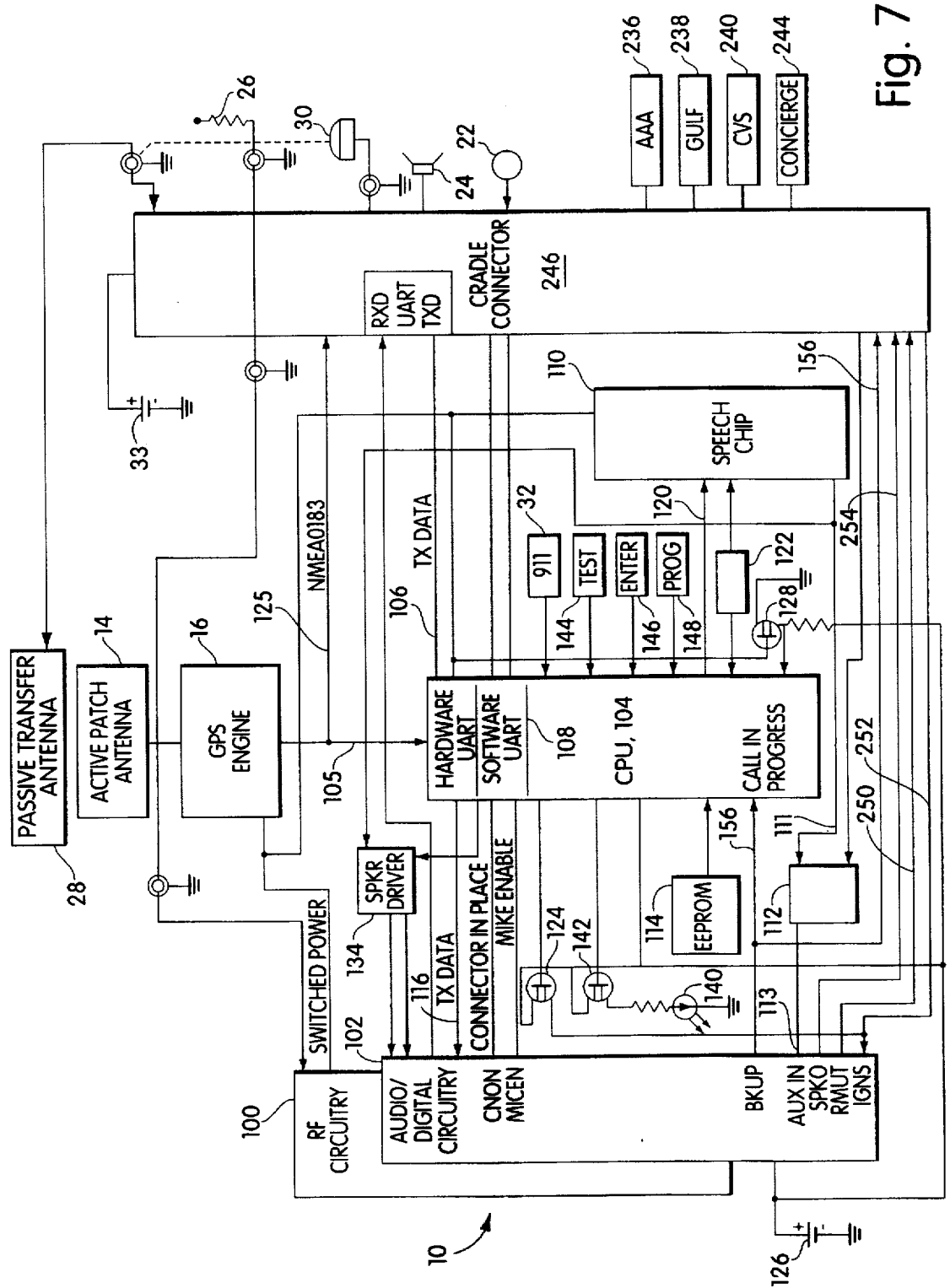

5,736,962

TIME SINCE LAST FIX ANNUNCIATION SYSTEM FOR GPS-BASED WIRELESS RESCUE SYSTEM

FIELD OF INVENTION

This invention relates to GPS-based emergency location systems, and more particularly, to a system for assisting emergency personnel to determine the validity of GPS-derived location through the annunciation of the time since last fix.

BACKGROUND OF THE INVENTION

Presently, GPS-based emergency location systems exist which are cellular based in which the location of the cellular phone is determined through a GPS receiver which outputs its location through the cellular phone to public service access points or PSAP'S from which emergency operators dispatch rescue services.

For all GPS-based location systems it is paramount that the GPS antenna associated with the GPS receiver see the satellites. For a 2-D fix, three satellites must be in view, whereas for a 3-D fix, four satellites must be in view. The U.S. constellation of GPS satellites currently includes 26 satellites of which 8 to 10 satellites are in view from any given location. What prevents these satellites from being in view are trees, buildings and other structures which are in the line sight between the GPS antenna and any one or a number of satellites.

It is noted that satellite fixes can take as short as two seconds to acquire, given ephemeris, almanac and time to as long as ten to fifteen minutes when none of the above is available. As can be seen, in the best of circumstances if the GPS receiver is turned on at the time of the emergency, either no position is broadcast until a fix is achieved or a previously-stored position is broadcast until the GPS information is updated which may take as long as ten to fifteen minutes.

This presents EMT's or other dispatch personnel with a problem upon receipt of the latitude and longitude of a caller requesting emergency services. If the phone and co-located GPS was not on at the time of the emergency call, it is possible that dispatch units would be sent to the wrong location, i.e., a previously stored latitude/longitude. This situation is more likely to occur if the cellular phone is handheld and carries its own GPS receiver and antenna when a person travels from location to location without turning the phone on.

Moreover, even if the GPS receiver is on, if satellites are not in view for an extended period of time, this also gives an invalid location to the PSAP operators. Note that when an individual carrying such a device enters a building, satellite signals are lost. If the phone is activated, the stored position is read out and transmitted to the PSAP. In this case, the location is sufficiently valid to enable rescue units to be dispatched. However, there is no way for the PSAP operators to ascertain that the transmitted location is valid. This is because the PSAP operator cannot deduce from the information sent that the individual has entered a building.

Additionally, when an individual takes such a phone and travels to a different city, a PSAP operator in that city could not, without further information, rule out the reported position, which may be many tens or hundreds of miles off, as being invalid. This is because the cities might not be very far apart. Also, when an unusual position is reported to a PSAP, it is not possible to disregard the transmitted position based on the assumption that there is an equipment error. Also, as is often the case in some states, calls are routed to a single PSAP within a state so that no position information is obviously wrong. Additionally, some calls emanating from one state are picked up by cell sites in an adjoining state.

All of the above militates towards uncertainty when a PSAP receives an emergency call with GPS-based position information.

The situation becomes still worse when such phones are located in motor vehicles. When a GPS-based wireless emergency location system is utilized in a car, oftentimes when the car is parked in a covered garage, no satellite fix is possible. If a driver is accosted in the garage and activates his or her emergency location system, it is impossible for the PSAP operator to ascertain if the location for the emergency call is valid even though the position of the car as it entered the garage is stored and transmitted. Again, in this case the position may be valid, but the PSAP operator has no way of deducing that the car is in a garage from raw latitude/longitude information.

If the car is stolen or hijacked and the thief disables the GPS, then this fact is generally unknown to the PSAP operator which generally frustrates vehicle recovery or twarting the hijack. It is noted that cars can travel extensively in short periods of time making the broadcast of previously stored positions a problem. There is also a problem in ascertaining the position of callers who find themselves in urban environments, through tunnels, under expressways or in the vicinity of objects which block the view of the sky since the satellites are no longer in view.

In summary, all of the above situations are unknown to the PSAP operators if the only information that they receive is latitude and longitude. It will be appreciated that merely storing and transmitting the last latitude and longitude is not enough to permit ascertaining if the reported position is valid. Moreover, position alone, while if valid is useful in ascertaining the general area in which a caller may be located, does not pin-point the individual nor give enough information for the individual to be reliably found during periods of loss of satellite signals due to blockage. This is because it is not possible to predict when the satellites will be reacquired.

SUMMARY OF THE INVENTION

In the subject system, in addition to reporting the last latitude and longitude as received by a GPS receiver at the cellular phone, the time of last fix is annunciated, with the time of the prior fix being stored in one embodiment in an $E^2ROM$ and compared with the present time in order to annunciate the time since last fix. Also annunciated can be the velocity at the time of last fix as well as direction of travel. It is noted that this information is available as the NMEA 0183 output of a standard GPS receiver which outputs both latitude and longitude, velocity, direction and time as a matter of course. Current time is established by every GPS receiver since it is essential for the calculation of latitude and longitude.

In one embodiment, once the GPS receiver has locked onto satellites and the almanac and the ephemeris is established, the time of day is also established. For GPS receivers such as the Motorola Encore model, the time when a fix has occurred is indicated by the setting of a flag. This flag indicates that the latitude and longitude data is valid. For such a GPS receiver, valid data can be established when either a 2-D or a 3-D fix is achieved, assuming the location is accurate within a predetermined distance. Such distances are set by the GPS manufacturers, but can vary from over 1,000 feet and to as little as 240 feet.

By providing an annunciation of the time since last fix, the validity of incoming position data can be established. If velocity and direction are annunciated, it is possible for PSAP operators to calculate the current position of the individual using dead reckoning techniques commonly used by the U.S. Coast Guard. Thus, if the fix is many days old, it is clearly invalid. If it is hours old and the velocity indicates walking, then one can deduce that the call came from a building. If the fix is tens of minutes old and the velocity indicates automobile speeds, then a dead reconing scenario is indicated.

In summary, annunciating time since last fix permits the PSAP operators to ascertain whether or not a reported position is valid. With other information such as velocity, the PSAP operator can deduce that a person making an emergency call has entered a building. This is because a PSAP operator can assume that if the time since last fix is less than several hours and if the velocity indicates a person walking, the person is probably within a building. If the time since last fix is a matter of days, then no valid information can be assumed about the location of the stricken individual.

Likewise, if a car is in covered parking lot in which satellites are not in view, then assuming that the previous velocity was in excess of normal walking velocity, e.g., more than 3 miles an hour, then it can be ascertained at least that the call is coming from a motor vehicle, if not that the vehicle is in a covered parking area.

In order to accomplish the annunciation of the time last since last fix, as well as velocity and direction of travel, in one embodiment, a speech synthesizer at the cell phone is coupled to a CPU which decodes the NMEA 0183 sentence from the co-located GPS receiver. The latitude and longitude is stored either at the CPU or by the GPS receiver, with standard GPS receivers storing last valid latitude and longitude in non-volatile memory.

Regardless of where the last latitude and longitude is stored, the time of the last valid fix can be ascertained through the aforementioned valid-data flag such that upon correlating the latitude and longitude with the time of last valid data, one can ascertain how long ago a valid fix occurred.

In one embodiment, only the time of this last valid data is stored in E²ROM, with the last latitude and longitude being stored by the GPS receiver.

Regardless, when an emergency call is initiated, the cellular phone, through its speech synthesizing unit, calls out MAYDAY, followed by whatever latitude and longitude has been stored, which is in-turn followed by an annunciation of the time since last fix. Thus, the verbalized string may be "MAYDAY, MAYDAY, MAYDAY, Position 40.21.10 North by 70.31.06 West, 26 minutes since last fix, Velocity 0.2 miles an hour, Direction 267 degrees". With an annunciation of the this type of information, it is possible for the PSAP operators to ascertain whether or not the last fix is sufficiently recent to be acted upon. This is especially important in portable cellular-based emergency location systems in which the cellular phone is transported from one city to another. It is also important in the aforementioned situations in which one enters a building which blocks the view of the satellites. It also solves the problem of a car having a GPS-based wireless emergency location system being parked in a covered parking lot.

The information provided by the subject system thus alleviates a problem with the physics of GPS location systems, that being the requirement of the GPS antenna having an unobstructed view of the satellites.

It will be appreciated while the subject invention will be described in terms of annunciating time since last fix and other data verbally, it is within the scope of the present invention that the same information be transmitted digitally.

It will also be appreciated that regardless of whether velocity and direction are annunciated, as a first approximation to be able to ascertain whether the location of the caller is valid, providing an annunciation of time since last fix provides sufficient information for the PSAP operators as to whether or not to dispatch emergency vehicles to the indicated location. Moreover, while the description of the invention centers on cellular phones, any wireless phone is within the scope of this invention.

BRIEF DESCRIPTION OF THE DRAWINGS

These and other features of the Subject Invention will be better understood taken in conjunction with a Detailed Description in conjunction with the Drawings of which.

DETAILED DESCRIPTION

Figure 1:
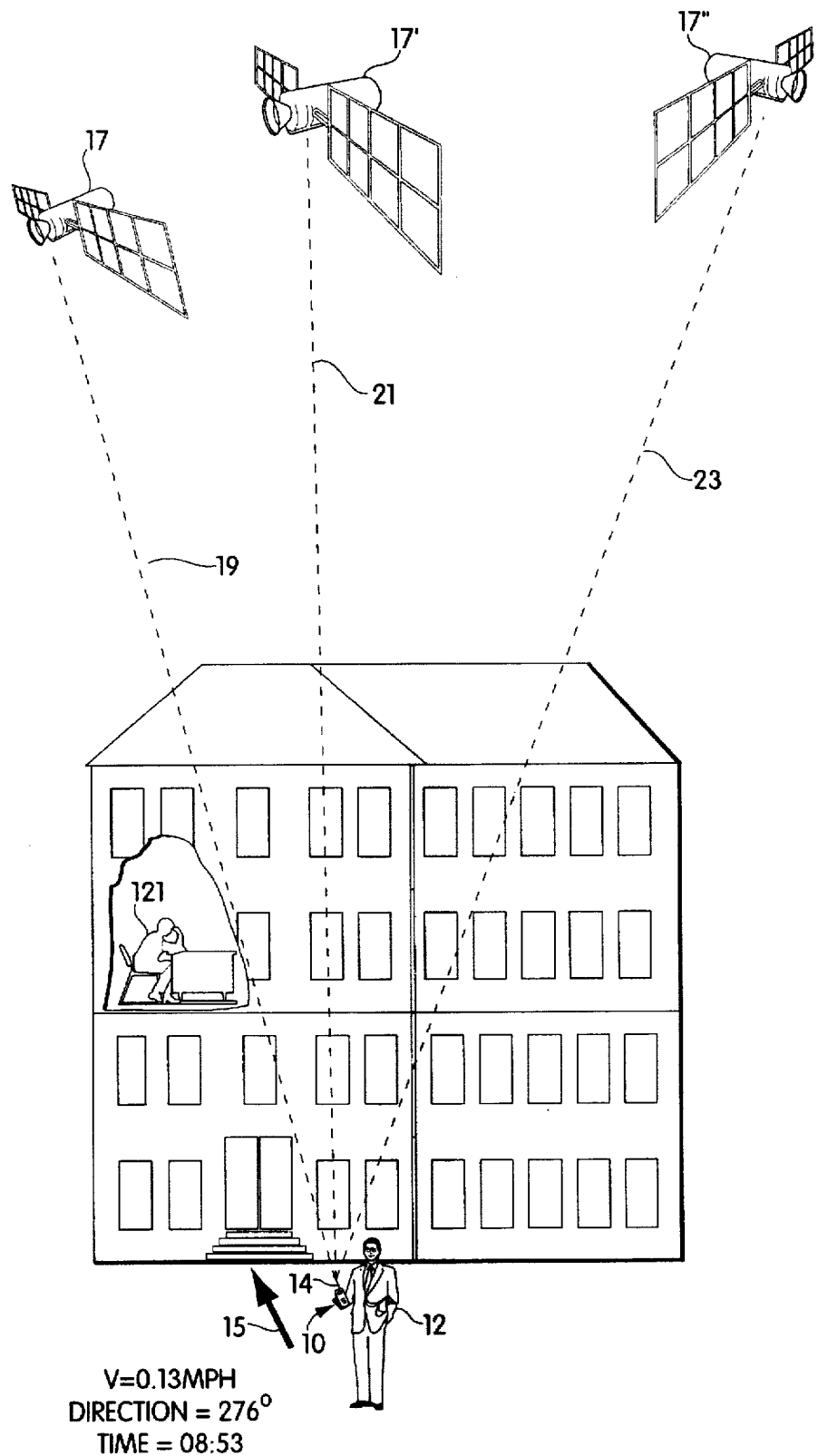
FIG. 1 is a diagrammatic representation of a typical scene in which an individual carrying a GPS-equipped cellular phone approaches a building, with the building blocking at least a number of the satellites.
Figure 2:
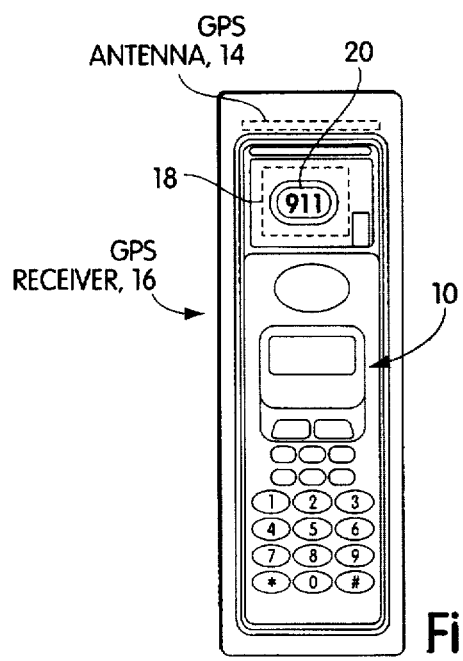
FIG. 2 is a front view of a GPS-equipped cellular phone showing a 911 button, a GPS antenna, and a synthesized speech/dialer board for generating the annunciation of the MAYDAY, the position, and the time since last fix, as well as velocity and direction of travel if desired.

Referring now to FIGS. 1 and 2, a phone 10 carried by an individual 12 has an integrally carried GPS antenna 14 and an integrally carried GPS receiver 16, with the phone having an integrally carried dialer and speech synthesizer board 18 for controlling the cellular phone to place the emergency call. In the illustrated embodiment, a 911 call is placed by pushing button 20.

As depicted, individual 12 is shown entering a building 13 walking at a velocity indicated by vector 15. This velocity may, for instance, be 0.13 miles per hour with the individual walking in a direction of 276 degrees magnetic. The time of the fix to which these numbers pertain is illustrated as being 0853AM. When the individual disappears within the building, the GPS antenna 14 will have its line of sight cut to various satellites, here represented by reference character 17, on which the corresponding GPS receiver depended to provide positional fix.

When the individual reaches his or her destination, illustrated at 12', assuming that he or she has a heart attack or other medical emergency, if he or she pushes the 911 button, i.e., button 20, then the cellular phone dials 911 and reports the position that the GPS received when the individual walked into the building along with the time of last fix and optionally velocity and direction of travel. Note that position and the time of the last fix is stored at the phone. With the report of the information, the validity of the fix can be ascertained and emergency personnel may be directed reliably to the building if not to the floor so as to effectuate rescue. It is noted that attempts to provide GPS fixes within a building are met with failure due to the fact that the GPS antenna cannot see the satellites.

Even outside of the building, the line of sight to a satellite may be blocked by a building as illustrated by dotted line 19, whereas satellites 17' and 17" are in view of GPS antenna 14 as illustrated by dotted lines 21 and 23.

The message transmitted is one which may have the following annunciation, "MAYDAY, MAYDAY, MAYDAY, Position 40.23.16 North by 070.41.06 West, Phone Number 617-xxx-xxxx, 27 minutes since last fix, velocity 0.13 miles per hour, direction of travel 276 degrees".

Figure 3:
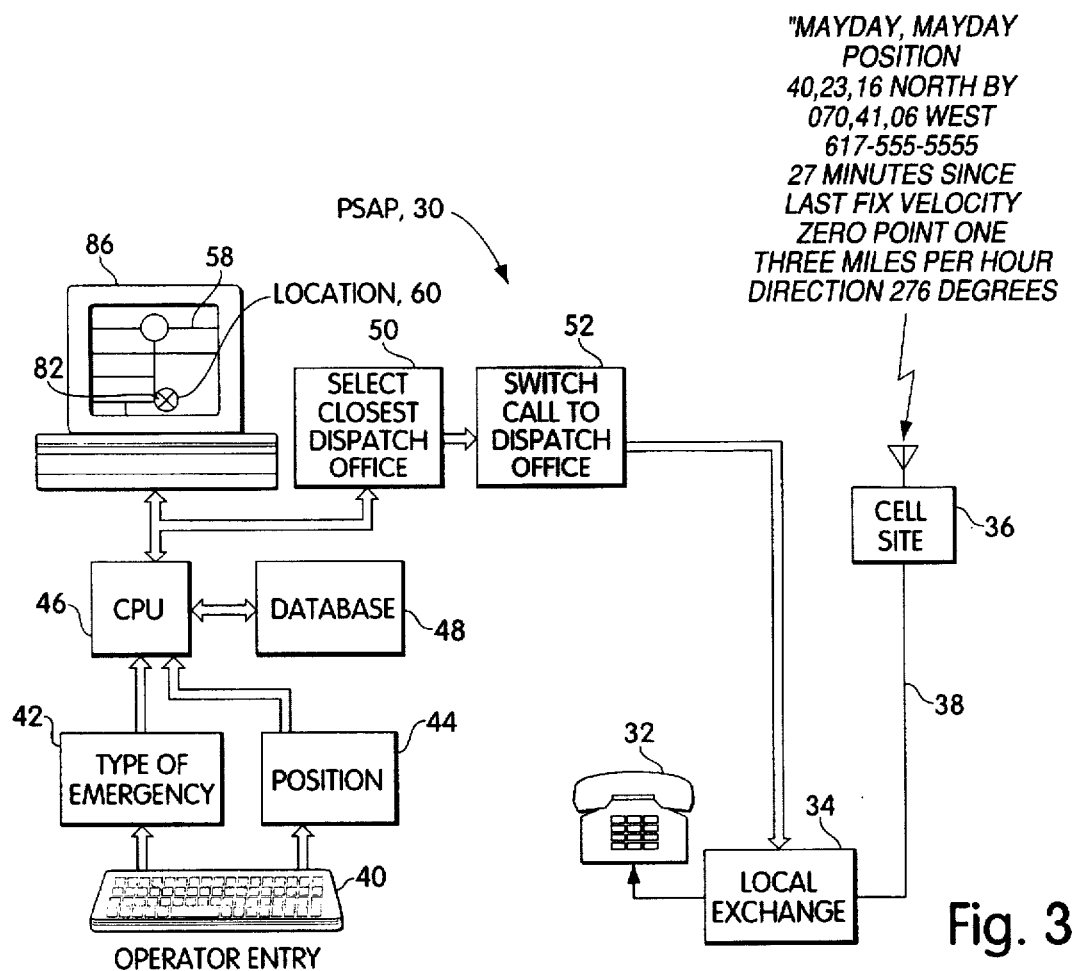
FIG. 3 is a block diagram of a typical PSAP coupled to a cell site via a local exchange, wherein the position and type of emergency is operator-entered, and with the time since last fix information giving the operator an opportunity to check the validity of the received position.

Referring now to FIG. 3, this information is transferred to a dispatch center, in this case, PSAP 30, with the information communicated to the PSAP operator via telephone 32 coupled to a local exchange 34 in turn coupled to a cell site 36 via land line 38.

The information which is verbally available to the operator is entered at keyboard 40 with the type of emergency, if known, being entered at 42 and with the position being entered at 44. Units 42 and 44 are coupled to a CPU 46 in turn coupled to a database 48, which contains maps and charts. Locations on the maps and charts are accessible by a latitude and longitude as is common.

Note that the operator can ascertain by virtue of having heard the time since last fix whether or not the latitude and longitude is valid and cause the system to select the closest dispatch office 50 as well as optionally switching the call to this dispatch office as illustrated at 52. A monitor 56 coupled to CPU 46 displays a map 58 on which location 60 of the caller is depicted by cursor 62.

Protocols developed within the PSAP determine whether or not the position is valid. These protocols also permit deterring via dead reckoning techniques where the actual position of the caller or vehicle is likely to be. By placing the cursor on the map regardless of its validity, one can ascertain by drawing various circles with the cursor at the center a zone in which the caller may be located, depending on the time since last fix as well as velocity. Direction of travel, may or may not be useful to indicate the position of the caller since the caller may take many turns since the last fix. Nonetheless, direction of travel can provide additional information as to the likely whereabouts of the caller.

Figure 4:
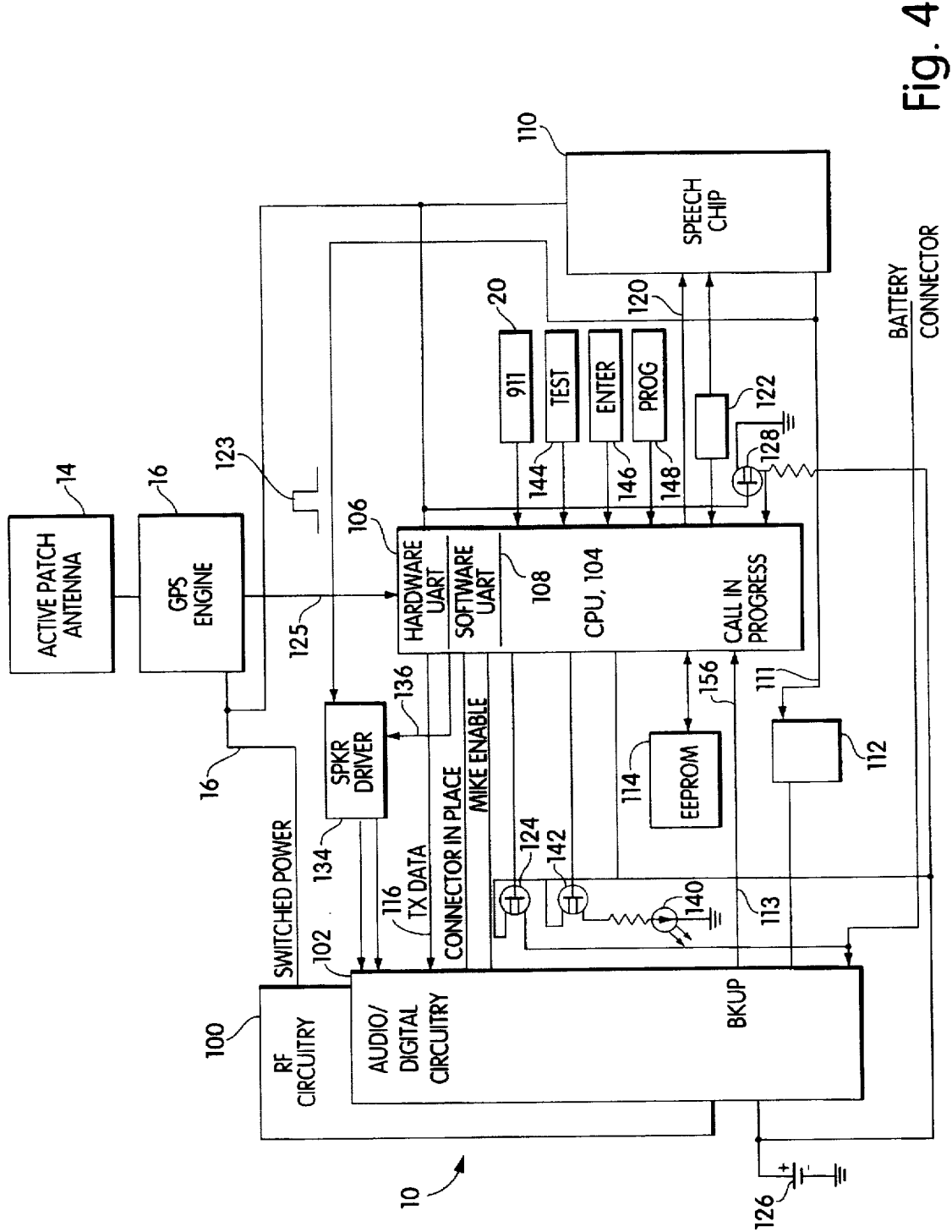
FIG. 4 is a block diagram of the phone of FIG. 2 indicating the synthetic speech generating and dialing circuitry within the cellular phone to provide a synthetic voice rendition of the latitude and longitude as well as a verbal rendition of the time since last fix and optionally, velocity and direction.

In order to accomplish the above, and referring now to FIG. 4, cellular phone 10, in general, has RF circuitry 100 and audio/digital circuitry 102 for the provision of cellular phone calls. Speech synthesizer and dialer board 18 includes a CPU 104 which includes a hardware UART 106 and a software UART 108, with CPU 104 being coupled to a speech synthesizer 110 for the purpose of providing the requisite message via an audio line 111 through an audio mixer 112 to an audio input terminal 113 of the audio/digital circuitry. An E²ROM 114 is utilized to store the preprogrammed telephone numbers and other data that is used by CPU 104 to control the operation of cell phone 10 through its audio/digital circuitry 102. For this purpose, a TX data line 116 is provided to control a dialer section and all phone related functions for cellular phone 10.

It will be appreciated that CPU 104 provides control of speech chip 110 via control line 120, with a crystal 122 providing the speech clock.

With respect to the E²ROM, this device is utilized not only to store preprogrammed telephone numbers, but is also utilized to store the time of day coincident with a flag 123 on NMEA bus 0183 bus 125 being up. Thus, the time stored in E²ROM 114 is that which comes from GPS receiver 16 coincident with flag 123. This indicates the time of last fix.

When button 20 is depressed, the time from GPS receiver 16 is read out and compared with the time of last fix established in the E²ROM 114. The subtraction of these two times results in the time since last fix which is then audibilized via speech synthesizer 110 under the control of CPU 104.

As to the remainder of the activation of the cellular phone, automatic turn-on of the cellular phone upon depression of switch 20 is accomplished through a power enable transistor circuit 124, which is in turn utilized to turn on the cellular phone, with power being derived from phone battery 126 as illustrated. Note that the turning off of switched power on line 127 is sensed by transistor circuitry generally illustrated at 128 so that CPU 104 can be placed in its low power drain mode.

It will be appreciated that depression of one of the switches to be described hereinafter coupled to CPU 104 via software UART 108 over TX data line 132 causes CPU 104 to initiate the appropriate message to be generated and causes cell phone 10 to dial the appropriate number.

In the programming of E²ROM 114, an audio output of speech chip 110 is utilized to drive an internal speaker of cell phone 10, not shown, via speaker driver 134 controlled by CPU 104 via volume control 136.

Also provided as an input to CPU 104 is a "test" switch 144, an "enter" switch 146, and a "program" switch 148 for the testing of the system and for entering a predetermined number into E²ROM 114.

Also provided at the cell phone is an LED indicator 140 driven by a transistor circuit 142 to indicate that the GPS receiver has a GPS fix.

Figure 5:
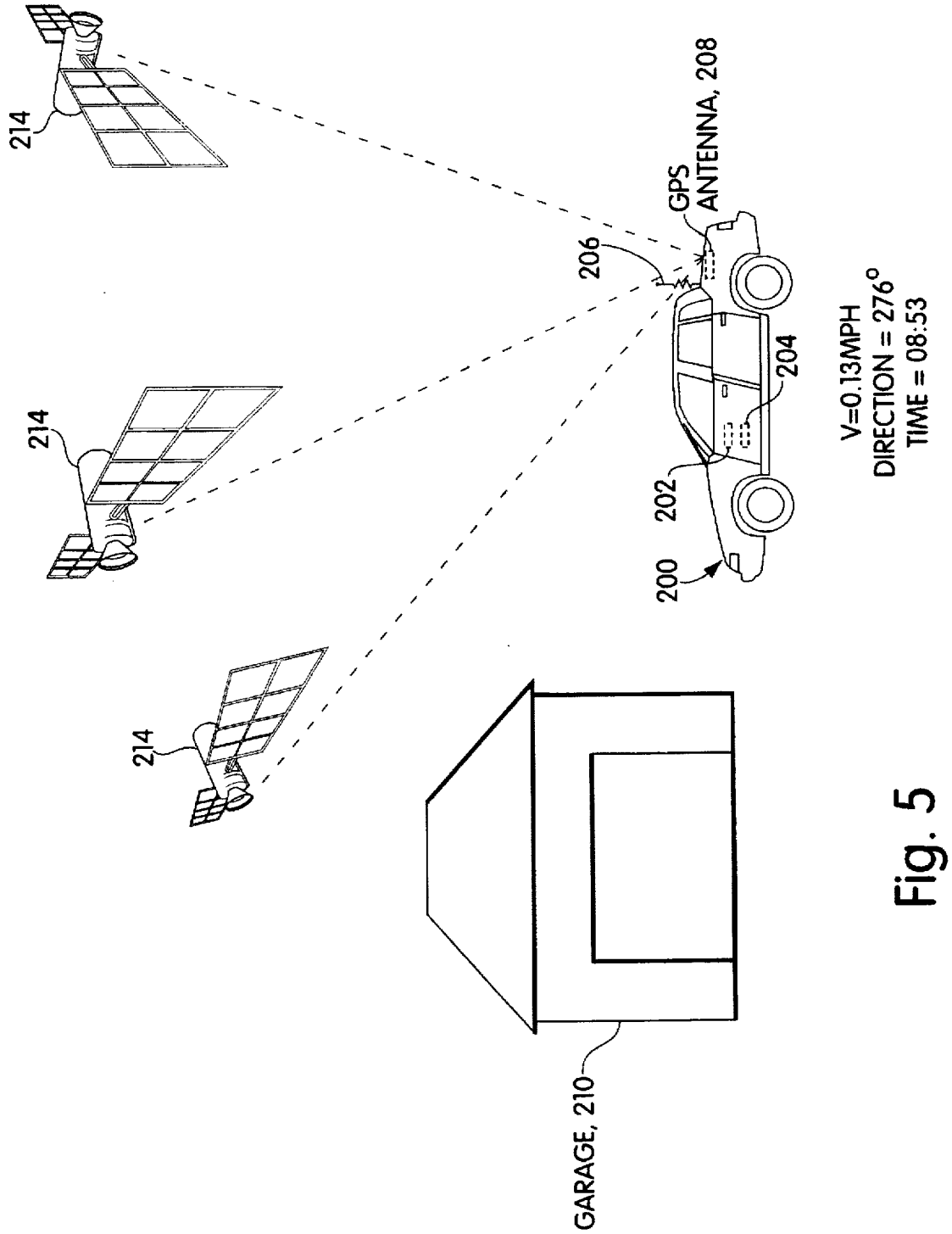
FIG. 5 is a diagrammatic illustration of an automotive scenario in which the subject system broadcasts the velocity, direction and time since last fix based on the time and position of the vehicle as it entered a garage.

Referring now to FIG. 5, in this scenario a car 200 has an internally carried cell phone 202 and a GPS receiver 204 respectively coupled to a cellular phone antenna 206, with the car having an externally-carried GPS antenna 208. Car 200 is shown entering a garage 210 with satellites 214 in view and providing valid position information to GPS 204 at that time.

In this case, the system declares that as the vehicle is entering the garage, its velocity is 10 miles an hour, its direction of travel is 270 degrees and the time is 0853AM. When the vehicle is parked in the garage, the view of the satellites from GPS antenna 208 is obscured by the garage superstructure.

Should a person entering in the vehicle sometime later be accosted, and assuming the individual can reach the 911 button of the cellular phone, then an emergency call will go out giving the latitude and longitude of the vehicle as it entered the garage. Since the time since last fix will be on the order of minutes or hours, it can be deduced by PSAP personnel that since the velocity was 10 miles per hour, the calling entity is a motor vehicle and the car must have been entering a garage in view of the time since last fix. Thus in this scenario, it may be appropriate to dispatch rescue units to the indicated location.

In the case of the vehicle being stolen from the garage, a car alarm system may trigger the cellular phone to make the emergency call to 911 with a "stolen vehicle" message. The PSAP operators having heard the stolen vehicle message, can deduce from the time since last fix and last velocity that the car was at one point in a garage. If the perpetrator does not disable the GPS or cell phone, then the vehicle track may be maintained by the repetitive transmission of the location of the vehicle as the car moves. If the car is in a densely populated urban setting in which buildings may obscure the satellites, then the time since last fix, along with velocity gives a relatively accurate way of ascertaining the progress of the vehicle despite the fact that at certain times no satellite fix is possible. Note that with a vehicle going 60 miles an hour, the time that the GPS antenna does not see the satellite is limited. As will be appreciated, the above scenario can be ascertained by virtue of each fix being accompanied by the time since last fix so that the amount of time in and about various buildings can be ascertained by personnel at the PSAP.

While the subject system has been described in terms of a unitary device, as described in connection with FIG. 6, phone 10 may be placed in a handsfree cradle 220 which has attached to it the usual handsfree microphone 222, speaker 224 and cellular phone antenna 226 that is mounted to the exterior of a car. For the handsfree cradle embodiment, a transfer antenna 228 is in close proximity to GPS antenna 14 and is connected to an external GPS antenna 230.

In addition to a 911 button 20 which activates the phone to place a 911 call, various service-request buttons 236, 238, 240, 242 and 244 cause the phone to dial respective predetermined numbers to give the location of the caller to the service provider. While the subject invention is described in connection with PSAP'S, information as to whether or not location is valid and the ability to do dead reckoning tracks is also applicable to any type of service provider.

In order to accomplish the requisite signalling, a printed circuit board 246 lies within handsfree cradle for the control of the cellular phone through the cellular phone bus structure not shown in this figure. It will be appreciated that the handsfree cradle may be mounted adjacent a car console 248 for convenience.

Figure 6:
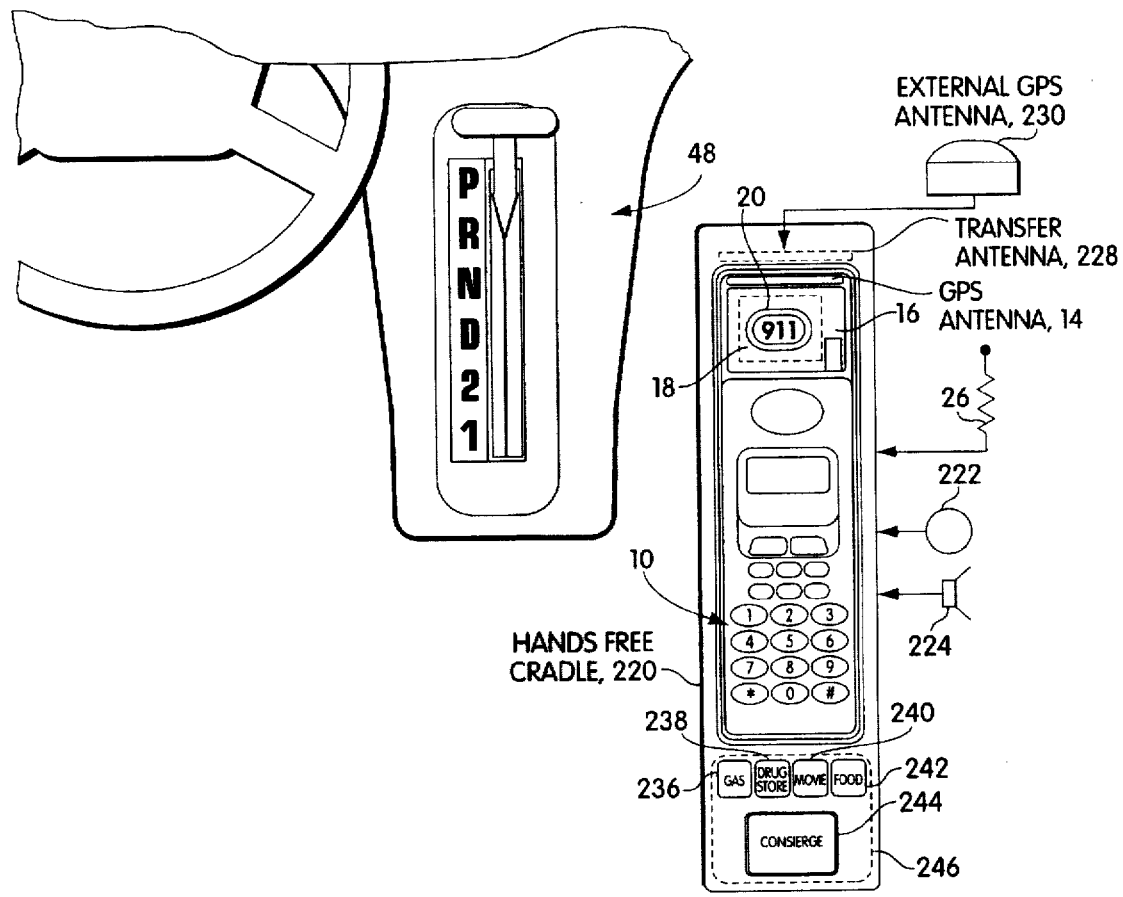
FIG. 6 is a diagrammatic illustration of a handsfree cradle embodiment of the subject invention in which the cellular phone is placed in a handsfree cradle, with the GPS antenna connected to external GPS antenna and with the usual handsfree functions being provided by the handsfree cradle; and, FIG. 7 is a detailed block diagram of the phone of FIG. 6 indicating the additional handsfree cradle connections and functions.

In order to accommodate the handsfree cradle embodiment of FIG. 6, and referring now to FIG. 7 in which like reference characters between FIGS. 4 and 7 are preserved, it will be appreciated that for the handsfree cradle 220, this cradle is provided with a cradle connector 246 to which service request buttons 236, 238, 240, and 244 may be connected. These service requests are coupled to CPU 104 via software UART 108 over TX data line 248 so as to cause CPU 104 to initiate the appropriate service requests and to cause cell phone 10 to dial the appropriate number. Note that a receiver mute line 250 is provided from cradle 220 for muting car mounted broadcast receivers, and ignition sense line 252 is provided from informing the cellular phone that the handsfree cradle has been connected. Speaker outline 254 is provided from the cellular phone to the handsfree cradle for driving speaker 24 and a back-up switch protection line 256 is provided for those informing CPU 104 that there is a call in progress and to provide this information to the handsfree cradle.

The call-in-progress line 256, called the "back-up switch line", is utilized by CPU 104 to request further services, in the form of a 911 back-up call when after the 911 button has been pushed, the call has been terminated to the PSAP. The falling of the call-in-progress flag causes CPU 104 to have cell phone 10 dial a central dispatch office number with a 911 back-up emergency service request, with the service request resulting in the operators at the dispatch center first calling the cellular phone to see if emergency services have been dispatched, and then to call the particular PSAP involved to assure the services have been rendered.

Having above indicated a preferred embodiment of the present invention, it will occur to those skilled in the art that modifications and alternatives can be practiced within the spirit of the invention. It is accordingly intended to define the scope of the invention only as indicated in the following claims.

What is claimed is:

1. In a wireless location system in which a wireless phone is provided with a GPS receiver for receiving GPS satellite signals and means for annunciating the position derived from said GPS receiver and for transmitting said annunciated position to a remote location by said wireless phone, means at said wireless phone for ascertaining when in time said GPS receiver acquires a position fix from said GPS satellites, means for ascertaining present time, means for calculating time since said fix, means for annunciating said time since said fix, and means for transmitting said annunciated time since said fix to said remote location with said position annunciation such that the validity of said annunciated position can be ascertained at said remote location.

2. The system of claim 1 wherein said fix is the last fix prior to the transmitting of said annunciated position.

3. The system of claim 1 wherein said means for annunciating position includes means for announcing the fact of an emergency, whereby said wireless location system is a wireless emergency location system.

4. The system of claim 1 wherein said means for announcing a request for services, whereby the requested services may be reliable provided to the appropriate location.

5. The system of claim 1 wherein said means or annunciating position includes a speech synthesizer.

6. The system of claim 1 wherein said GPS receiver outputs velocity of said GPS receiver and wherein said means for annunciating position also annunciates said velocity.

7. The system of claim 1 wherein said GPS receiver outputs direction of travel of said GPS receiver and wherein said means for annunciating position also annunciates said direction of travel.

\* \* \* \* \*